A. CLARK.
GRAIN SPREADER AND FEEDER.
APPLICATION FILED SEPT. 12, 1908. RENEWED MAR. 23, 1910.
957,036.
Patented May 3, 1910.
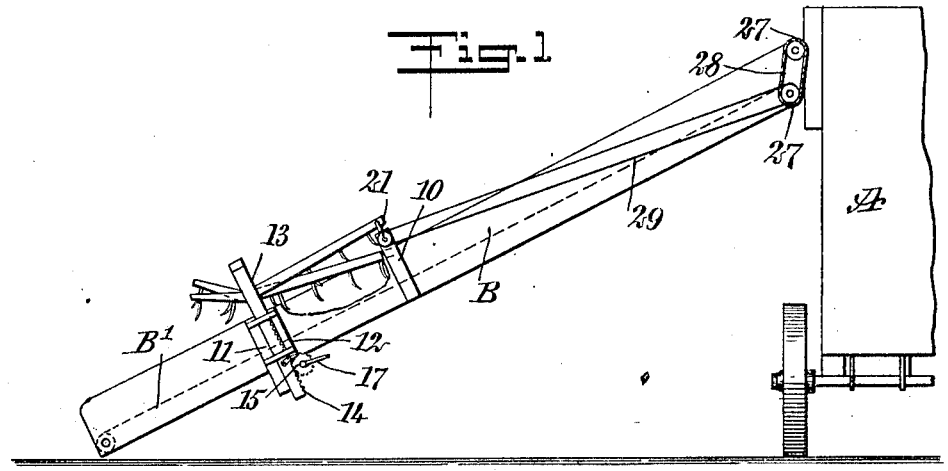
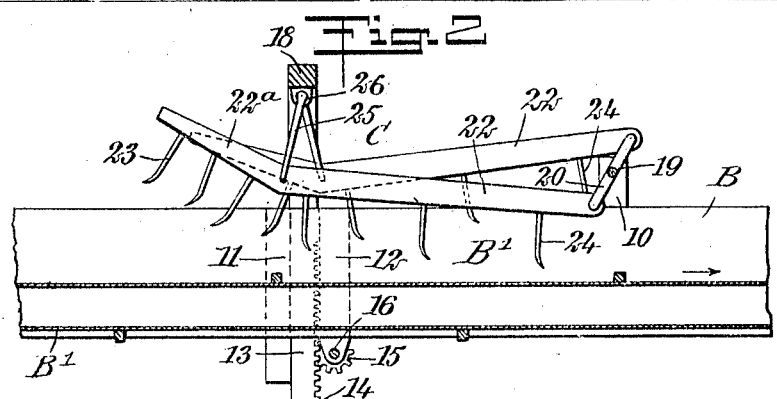
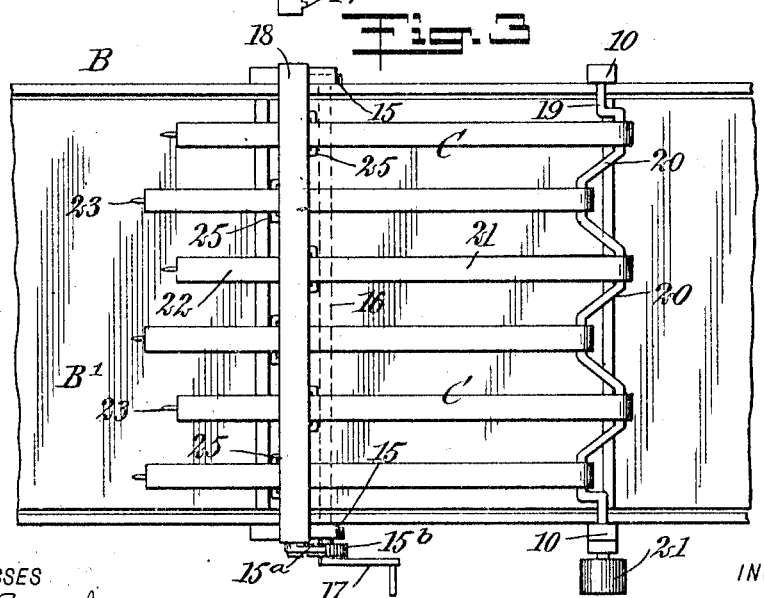
WITNESSES
INVENTOR
Alvin Clark
BY
ATTORNEYS

UNITED STATES PATENT OFFICE.

ALVIN CLARK, OF PORTLAND, OREGON.

GRAIN SPREADER AND FEEDER.

957,036.        Specification of Letters Patent.      Patented May 3, 1910.

Application filed September 12, 1908, Serial No. 452,715. Renewed March 23, 1910. Serial No. 551,194.

*To all whom it may concern:*

Be it known that I, ALVIN CLARK, a citizen of the United States, and a resident of Portland, in the county of Multnomah and State of Oregon, have invented a new and Improved Grain Spreader and Feeder, of which the following is a full, clear, and exact description.

The invention relates to a device applicable to the feed or supply table of threshing machines and machines of a like type, being especially designed for use in connection with the feeding of headed grain, which, even under the most favorable conditions of service, frequently "slugs" the cylinder.

The purpose of the invention is to provide a device that will supply the grain to the cylinder in an even and regular manner and in proper quantity, and to effectually prevent the grain from passing to the cylinder in bunches, the device being adjustable, and performing the work in an expeditious and reliable manner, relieving the attendants, known as "hoe-downs," of the duty or labor of shaking out the bunches.

It is a further purpose of the invention to feed, spread, scatter and disperse the bunches by "kicking," continuously during the feeding process at the reception of the bunches, and in such manner as to effect a complete separation of the constituent parts of the bunches and to regulate, through the operation of the device, the amount of grain fed relatively to the capacity of the cylinder, taking into consideration the condition of the grain, the feed being therefore regular and limited, which latter action is obtained by raising and lowering the device relatively to the feed or elevator table or conveyer.

It is also a purpose of the invention to provide a spreading and feeding attachment for threshing machines, that will maintain an even feed of grain to the cylinder from end to end and front to rear, and, as has been mentioned, effectively preventing "slugging" of the cylinder.

The invention consists in the arrangement of the spreader-arms relatively to the elevating or conveyer apron of the feed mechanism, and the adjustment of the arms to and from the apron.

In the drawings—Figure 1 is a side elevation of the device applied to the elevator or conveyer of a threshing machine; Fig. 2 is an enlarged longitudinal section through the device, and a portion of the elevator or conveyer, and Fig. 3 is an enlarged plan view of the device and that portion of the conveyer to which it is applied.

Similar characters of reference indicate corresponding parts in all the views.

A represents a portion of a threshing machine, B the elevator or conveyer frame, and B' the endless apron of the conventional type. With reference to the spreading and feeding device, it is by preference located between the receiving end and the center of the elevator, but its exact position is immaterial.

In constructing the attachment, it is preferably, but not necessarily, made as shown, standards 10 being secured to each side of the elevator-frame nearest the receiving portion of the thresher, and lower down, at each side of the elevator frame, parallel standards 11 and 12 are secured, between which standards, at each side of the elevator, racks 13 have guided vertical movement, the teeth whereof are designated as 14 and are engaged by pinions 15 on a shaft 16, suitably mounted in bearings at the bottom portions of the standards 12, as is best shown in Fig. 2.

At one end of the shaft 16 a ratchet-wheel 15$^b$ is secured and is engaged by a suitably mounted pawl 15$^a$, shown best in Fig. 3, and the shaft 16 is turned by a crank 17 or the equivalent thereof.

The device is raised and lowered from and to the apron B' by the operation of the racks 13, that are connected with the forward or receiving portion of the device, as is shown in Figs. 1 and 3.

A crank shaft 19 is journaled in the standards 10, the crank-arms 20 of the shaft being oppositely disposed, as shown in Fig. 3, and said shaft is provided with a pulley 21. The racks 13 are connected at their upper ends by a cross bar 18, and the crank arms 20 of the crank-shaft 19, and also the cross-bar 18, serve to carry and support a series of parallel arms C, that extend the entire width of the elevator B between its side members, as is also best shown in Fig. 3. These arms C are straight from their connection with the crank shaft 19 to a point below the cross-bar 18, as is shown at 22 in Fig. 2, and their end portions 22$^a$, that face the receiving end of the elevator, are upwardly inclined to a greater or lesser extent, as is also shown in Fig. 2. The upwardly-inclined ends 22ª of the arms C are provided with teeth 23, having their terminals bent in direction of the receiving end of the elevator B, while the straight sections 22 of said arms C are provided with teeth 24, the terminals whereof are bent in an opposite direction to the teeth 23. In the operation of the arms C, that are given a gyratory movement over the apron B', the forward teeth 23 tend to "kick" the advancing bundles, separate the grain and retard its progress to the cylinder, proportionately to the adjustment of the spreader relatively to the apron B', while the rear teeth 24 tend to spread the grain and feed it evenly to the cylinder.

Where the parts 22 and 22ª of the spreader-arms C connect, said arms are supported by swinging hangers 25, mounted in suitable bearings 26 upon the cross-bar 18, as is shown in Fig. 2.

Pulleys 27 are arranged upon the conveyer or a convenient support to be driven and to drive the apron B', being connected by a belt 28, and a belt 29 is carried from the driven shaft of one of said pulleys to the pulley 21 on the crank-shaft 19, as is illustrated in Fig. 1.

This device is simple, durable and economic, and is well adapted for the purpose intended.

What I claim as new and desire to secure by Letters Patent is:

1. A spreading and feeding device for grain, comprising a supply mechanism for the grain, arms adapted to reciprocate over the grain supply, the said arms having a rear straight portion and an upwardly inclined forward portion, teeth carried by the said arms, the teeth of the forward portions of the arms having their terminals bent in a forward direction and the teeth of the rear portions of the arms having their terminals bent in the opposite direction, means connected with the rear portions of the arms for operating the same, swinging hangers connected with the said arms, and means for raising and lowering the said hangers to adjust the said arms toward and from the grain supply.

2. In spreading devices for grain feed mechanisms, rotary reciprocating arms having a rear section substantially straight and a forward integral section shorter than the rear section and upwardly inclined, and teeth for the two sections the teeth of the forward upwardly inclined section having their terminals bent in direction of the receiving end of the feed mechanism, and the teeth of the rear straight section having their terminals bent in the opposite direction.

3. The combination with a grain feed mechanism for threshers and the like, of a crank shaft mounted to turn, a cross bar extending above the feed mechanism, means for raising and lowering said cross bar, arms having a rear straight portion and an upwardly inclined forward portion, teeth carried by the said arms, having separating and spreading action relatively to the grain, the teeth of the upwardly inclined forward portions of said arms having their terminals bent in direction of the receiving end of the feed mechanism, and the teeth of the rear straight portions of said arms having their terminals bent in the opposite direction, the rear ends of said arms being pivotally connected with the crank arms of said crank shaft, hangers carried by the said cross bar and connected with the said arms at the angle formed by the junction of the forward and rear portions of said arms, and means for turning the crank shaft.

4. The combination with a grain feed mechanism for threshers and the like, of a crank shaft mounted above the feed mechanism, pairs of parallel standards at opposite sides of the feed mechanism and extending below the bottom of the same, racks having vertical guided movement between said parallel standards, a cross bar connecting said racks at their upper ends, swinging hangers carried by said cross bar, arms connected with the crank arms of said crank shaft and with said hangers, teeth carried by the said arms, having separating and spreading action relatively to the grain, means for rotating the crank shaft, a shaft journaled in the bottom portions of two of said standards and extending beneath the feed mechanism, the said shaft being provided with pinions in mesh with the teeth of said racks, a ratchet wheel secured to one end of said shaft, a pawl engaging said ratchet wheel, and a crank for turning said shaft.

5. The combination with a feed mechanism of a threshing machine, of rear standards secured to the feed mechanism at opposite sides, parallel standards at each side of the feed mechanism forward of said rear standards, a crank shaft mounted to revolve in the rear standards, means for rotating the said crank shaft, arms pivotally connected at their rear ends with the crank arms of the crank shaft, racks at each side of the feed mechanism having guided vertical movement between the said parallel standards, a cross bar connecting the racks at their upper ends, swinging hangers carried by the cross bar for the forward portions of the said arms, the arms having their rear portions practically straight and their forward portions upwardly inclined, the hangers connecting with the said arms at the junction of their forward and rear portions, teeth carried by the said arms, the teeth on the forward portions of the arms having their terminals bent and pointing in a forward direction and the teeth on the rear portions of the arms having their terminals bent and pointing in a rearward direction, two of said parallel standards having bearings at their bottom portions, a shaft mounted to turn in said bearings and extending beneath the feed mechanism, and pinions carried by said shaft and meshing with teeth of the racks.

In testimony whereof I have signed my name to this specification in the presence of two subscribing witnesses.

ALVIN CLARK.

Witnesses:
W. B. BAILEY,
CHAS. H. DOBSON.